United States Patent
Radu et al.

(10) Patent No.: US 11,087,321 B2
(45) Date of Patent: Aug. 10, 2021

(54) SECURELY UPGRADING AN UNTRUSTED CHANNEL INTO A TRUSTED CHANNEL

(71) Applicant: MASTERCARD INTERNATIONAL INCORPORATED, Purchase, NY (US)

(72) Inventors: Cristian Radu, Beauvechain (BE); Anthony Steven Cooper, O'Fallon, MO (US)

(73) Assignee: Mastercard International Incorporated, Purchase, NY (US)

( * ) Notice: Subject to any disclaimer, the term of this patent is extended or adjusted under 35 U.S.C. 154(b) by 170 days.

(21) Appl. No.: 16/266,706

(22) Filed: Feb. 4, 2019

(65) Prior Publication Data
US 2020/0250669 A1    Aug. 6, 2020

(51) Int. Cl.
*G06Q 40/06* (2012.01)
*G06Q 20/40* (2012.01)
(Continued)

(52) U.S. Cl.
CPC ......... *G06Q 20/401* (2013.01); *G06Q 20/322* (2013.01); *G06Q 20/385* (2013.01);
(Continued)

(58) Field of Classification Search
CPC .. G06Q 20/401; G06Q 20/322; G06Q 20/325; G06Q 20/3821; G06Q 20/385;
(Continued)

(56) References Cited

U.S. PATENT DOCUMENTS

2003/0097596 A1*  5/2003  Muratov ................. G06F 21/62
                                                              726/26
2007/0021843 A1*  1/2007  Neill ....................... G06F 21/72
                                                              700/1
(Continued)

FOREIGN PATENT DOCUMENTS

JP      2009276935 A      11/2009

OTHER PUBLICATIONS

Krista Becker, Mobile Phone: The New Way to Pay?, Feb. 2007, Federal Reserve Bank of Boston, web, 1-11 (Year: 2007).*
(Continued)

*Primary Examiner* — I Jung Liu
(74) *Attorney, Agent, or Firm* — Buckley, Maschoff & Talwalkar LLC (57) ABSTRACT

Methods, apparatus and systems for upgrading an untrusted channel to a trusted channel. In an embodiment, a verifier server computer receives a request to verify an untrusted channel address from a first service component that is associated with a Consumer identifier, retrieves a trusted channel address from a verifier database, and then generates a one-time password witness value. The verifier server computer then splits the one-time password witness value into a first portion and a second portion, and transmits the first portion to the first service component and transmits the second portion to the second service component. The process includes receiving a recomposed value from the first service component, splitting the recomposed value into a first recomposed value and a second recomposed value,
(Continued)

generating a reverted one-time password value, determining that the reverted one-time password value equals the one-time password witness value, and then transmitting an authentication message to the first service component confirming authentication of the consumer enabling upgrading of the untrusted channel to a trusted channel.

7 Claims, 4 Drawing Sheets

(51) Int. Cl.
| | |
|---|---|
| *G06Q 20/38* | (2012.01) |
| *G06Q 20/32* | (2012.01) |
| *H04L 9/32* | (2006.01) |
| *H04L 9/08* | (2006.01) |
| *H04L 29/06* | (2006.01) |
| *H04W 60/00* | (2009.01) |
| *H04W 12/06* | (2021.01) |
| *H04W 12/102* | (2021.01) |

(52) U.S. Cl.
CPC ......... *G06Q 20/3821* (2013.01); *H04L 9/085* (2013.01); *H04L 9/3228* (2013.01); *H04L 63/12* (2013.01); *H04W 12/068* (2021.01); *H04W 12/102* (2021.01); *H04W 60/00* (2013.01); *H04L 2209/56* (2013.01)

(58) Field of Classification Search
CPC .............. G06Q 20/4014; H04L 9/3228; H04L 63/0838; H04L 9/085; H04L 2209/56; H04L 63/12; H04L 63/13; G07F 7/1091; H04W 60/00; H04W 12/068
See application file for complete search history.

(56) References Cited

U.S. PATENT DOCUMENTS

| | | | | |
|---|---|---|---|---|
| 2007/0028299 | A1* | 2/2007 | Albano | G06F 21/629 |
| | | | | 726/5 |
| 2008/0270301 | A1* | 10/2008 | Jones | G06Q 40/00 |
| | | | | 705/41 |
| 2015/0074391 | A1 | 3/2015 | Souza et al. | |
| 2017/0331819 | A1 | 11/2017 | Quirke et al. | |
| 2020/0036707 | A1* | 1/2020 | Callahan | G06F 21/32 |

OTHER PUBLICATIONS

PCT International Search Report for Application No. PCT/US2019/067470 dated Mar. 31, 2020, 9 pp.

* cited by examiner

SECURELY UPGRADING AN UNTRUSTED CHANNEL INTO A TRUSTED CHANNEL

FIELD OF THE DISCLOSURE

Embodiments described herein generally relate to methods and systems for providing services which securely upgrade an untrusted channel into a trusted channel on a digital platform. In an implementation, a secure remote commerce (SRC) platform is configured to upgrade an untrusted channel to a trusted channel in order to perform secure one-time password (OTP) processing on behalf of issuer financial institutions (FI's), which allows for secure and fast mass deployment of SRC transactions by removing the necessity for each issuer FI to handle such costly and complex security operations.

BACKGROUND

Remote commerce, or Internet-based commerce, continues to grow in popularity as a purchasing environment for consumers and is typically serviced by a wide variety of stakeholders. In a typical situation, a consumer enters his or her payment card's Primary Account Number (PAN) into a merchant's shopping application or website. Currently, many different types of integration models and practices exist for Internet-based commerce, and the variety of implementations and lack of common specifications results in fragmentation, complexity, and inconsistency.

Portable consumer electronic devices, such as smartphones, tablet computers, digital music players and the like, have been developed that include desirable functionality and thus the number of mobile device users and/or owners keeps growing. Such mobile devices can store many different types of information and can perform many different operations for users. The overall popularity of such mobile devices, especially smartphones, has led to the development of processes for using them to conduct financial transactions, for example, transmission of a payment between a payer (a consumer or payment card account holder or cardholder) and a recipient (or payee, such as a merchant or another cardholder) in exchange for goods and/or services. Of course, personal computers and other non-portable digital devices or appliances that are connected to the Internet and support browser software, may also store many different types of information and may also be utilized by a user to perform many different types of operations, including conducting financial transactions. In a typical purchase transaction, for example, a consumer may utilize a digital wallet application (which includes, for example, the consumer's payment card account data) running on his or her smartphone (or on a non-portal consumer device) to make a purchase from a merchant. In some implementations, a web browser is utilized by the consumer to shop at a merchant's web site and to conduct a purchase transaction. A merchant device (such as a merchant server computer) then transmits consumer payment card account data to a payment network. The payment network identifies the issuer financial institution (FI) (for example, a bank) that issued the consumer's payment card account, and then transmits the payment data to that issuer FI for consumer authentication and payment transaction authorization. If all is in order, the merchant device receives a payment transaction authorization message to complete the purchase transaction.

Secure Remote Commerce (SRC) is an evolution of remote commerce that provides for secure and interoperable card acceptance established through a standard technical framework and specification, which is promulgated by EMVCo, LLC (The acronym "EMV" stands for "Europay, Mastercard, Visa," and denotes a global standard for chip-based credit card account and debit card account transactions that ensures security and global acceptance of such accounts.) SRC enables a merchant (or its agent) to securely request and receive interoperable payment data used to process accepted cards in a remote commerce transaction (such as an Internet purchase transaction). Thus, SRC is a common approach that provides security and interoperability to deliver a safe card payment experience in a remote environment.

The goal of SRC is to enable the secure exchange of payment information through common interfaces between participating entities, which may include, for example, consumers, merchants and issuers. EMVCo published a technical framework which provides guidance for participation in an SRC Program, and a specification which provides requirements for stakeholders who actively interact with an SRC System. The technical framework is the foundation which includes broad SRC concepts and payment ecosystem considerations for the establishment of an SRC Program, and it includes roles and functions for stakeholders who participate. The specification is an extension of the technical framework, which provides requirements for the SRC ecosystem. The specification also includes requirements and data definitions for specific use cases, and can be found at www.emvco.com/emv-technologies/src/. An SRC system may work with, or comprise, or be comprised by, a Trusted Service Provider (such as the "Mastercard Digital Enablement Service" (MDES) platform developed by Mastercard International Incorporated, the assignee of the present application) which provides a suite of on-behalf-of (OBO) services that support the management, generation, provisioning and utilization of digital payment credentials (such as tokens), for example, into and/or using mobile devices and/or wallet servers.

The General Data Protection Regulation (GDPR) is a regulation passed by the European Union (EU) in May 2018 that shifts the ownership of customer data from the organizations that use it to the individual customer. This regulation applies to European businesses that work with the customer data of EU citizens and it also applies to any entities that work with those businesses as well, thus making GDPR a global data protection law. Failure to comply with the GDPR can result in a hefty fine, and thus businesses recognize that they must have systems and processes in place that comply with the regulation.

The GDPR mandates that companies receive customer consent before processing or storing customer data. The request for consent must be laid out in plain, straightforward language and must clearly explain how the customer's data will be used and for how long it will be used and stored. In the past, silence and/or inactivity from the customer was taken as consent, but that is no longer the case with GDPR because companies must be able to prove that they received approval from customers to use their information. Furthermore, the terms of consent need to be consistently accurate with the customer's most up-to-date information and the purpose for which the data is being used. If either condition changes, the company must obtain an updated consent from the customer. Lastly, customers have the right to withdraw consent at any time, which requires companies to respond and act upon the request in a reasonable timeframe.

The present inventors have recognized that there are opportunities for providing methods which provide services to Issuers which facilitate their participation in SRC transactions and which are also GDPR compliant, and which also remove the burden of costly and complex security operations from the Issuers.

BRIEF DESCRIPTION OF THE DRAWINGS

Features and advantages of some embodiments of the present disclosure, and the manner in which the same are accomplished, will become more readily apparent upon consideration of the following detailed description taken in conjunction with the accompanying drawings, which illustrate exemplary embodiments and which are not necessarily drawn to scale, wherein.

DETAILED DESCRIPTION

Reference will now be made in detail to various novel embodiments, examples of which are illustrated in the accompanying drawings. It should be understood that the drawings and descriptions thereof are not intended to limit the invention to any particular embodiment(s). On the contrary, the descriptions provided herein are intended to cover alternatives, modifications, and equivalents thereof. In the following description, numerous specific details are set forth in order to provide a thorough understanding of the various embodiments, but some or all of these embodiments may be practiced without some or all of the specific details. In other instances, well-known process operations have not been described in detail in order not to unnecessarily obscure novel aspects.

A number of terms will be used herein. The use of such terms is not intended to be limiting, but rather, the terms are used for convenience and ease of exposition. For example, as used herein, the term "consumer" may be used interchangeably with the terms "account holder," "cardholder," "prover," and/or "user" and are used herein to refer to a person, individual, business or other entity that owns (or is authorized to use) a financial account such as a payment card account (for example, a credit card account). In addition, the term "payment card account" may include a credit card account, a debit card account, and/or a deposit account or other type of financial account that an account holder may access. The term "payment card account number" includes a number that identifies a payment card system account, or a number carried by a payment card, and/or a number that is used to route a transaction in a payment system that handles debit card and/or credit card transactions and the like. Moreover, as used herein the terms "payment card system" and/or "payment network" refer to a system and/or network for processing and/or handling purchase transactions and related financial transactions, which may be operated by a payment card system operator such as Mastercard International Incorporated (the assignee of the present application) or a similar system. In some embodiments, the term "payment card system" may be limited to systems in which member financial institutions (such as banks) issue payment card accounts to individuals, businesses and/or other entities or organizations.

In general, methods and systems disclosed herein transform a Consumer-Verifier untrusted channel into a trusted channel for one-time password (OTP) use, regardless of the framework. However, some embodiments described herein utilize a payment system framework for ease of understanding, which should not be understood as limiting the process. For example, in order to allow the mass deployment of secure remote commerce (SRC) transactions for use by consumers, the operator of an SRC system provides services to Issuer financial institutions (FIs) to ease their participation in SRC transactions. In this manner, the SRC system removes the responsibility for costly and complex security operations from the Issuer FIs. Specifically, the operator of the SRC System offers tokenization by default, provides payment assurance data (cryptograms) by running platform-based 3DS2 processes, and handles security assurance services regarding adding consumer digital payment cards via Cardholder Authentication. All of the above rely on the use of One-Time-Password (OTP) security-based mechanisms based on trusted channels, for example, e-mail and/or mobile telephone numbers known to be associated with the consumer. This is true both for the case wherein the OTP mechanism is handled directly by a platform (such as the Mastercard Digital Enablement Services (MDES) platform operated by Mastercard International Incorporated for tokenization) or by an access control server (ACS) of the 3DS2 system operated by the SRC System (for proof of payment). However, since the SRC System does not own the consumer (who belongs to the Issuer FI, or to the bank that issued the consumer's payment account) then a trust or confidence process must be used to transfer trust from the Issuer FI to the SRC System (via upgrading an untrusted channel to a trusted channel) to allow the SRC System to handle secure OTP processing on behalf of the Issuer FI or bank.

Thus, in general, and for the purposes of introducing concepts of novel embodiments described herein, described are systems and processes for transforming or upgrading an untrusted consumer channel into a trusted consumer channel, which permits a Secure Remote Commerce (SRC) System to securely handle one-time password (OTP) processing on behalf of, for example, an Issuer financial institution (FI). Within an SRC System, each consumer has payment card account data (or digital payment card data) stored within a storage element of, for example, a consumer mobile device and/or a browser, and/or a server. The account data for the consumer payment cards is set in a tree data structure along with the consumer's device and the consumer device identifier, which may be referred to as a Consumer Profile (CP). Within this structure, all of the digital card data (which may be tokenized) representing multiple payment card accounts of the consumer are stored as data leaves of the tree data structure, regardless of the Issuer FI associated with any particular physical and/or digital payment card or payment card account. The tree data structure is rooted in the Consumer Identity (CI), which is a unique identifier utilized across all SRC Systems. Accordingly, the consumer must be able to easily remember her CI when she wants to refer to the Consumer Profile and its digital payment cards (i.e., its "leaves") for any operational needs. Therefore, the CI must be "user friendly" and "easy to remember" while still being unique. For these reasons, e-mail addresses and/or mobile telephone numbers are good candidates for use as a CI in the Consumer Profile because such identifiers are easy to remember and guarantee uniqueness within the SRC ecosystem. Accordingly, in some embodiments, the consumer's e-mail address is utilized as a CI when the consumer creates his or her identity during subscription or enrollment with the SRC System. In this case, the SRC System considers the consumer's e-mail channel as an untrusted channel, since the SRC System does not know and/or has no evidence or proof during subscription or enrollment that the e-mail channel is in fact associated with the consumer.

Accordingly, in some embodiments, starting from an existing consumer trusted channel known to the Issuer FI, a consumer's untrusted channel can be registered with the SRC System space and then can become a trusted channel for secure use with a one-time password (OTP) authentication mechanism under certain conditions. Specifically, the untrusted channel can become a trusted channel using the disclosed methods if: (a) the consumer or user does not grant consent for sharing the Consumer Identity (CI) with the Issuer FI, or (b) the Issuer FI indicated its wish to outsource SRC transaction security to the SRC System (for example, by offering this service to its customers as being the easiest and most intuitive consumer or user experience). In other embodiments, starting from an existing consumer trusted channel known to the Issuer FI, an untrusted channel registered with the SRC System can become a trusted channel if: (a) the Issuer FI does not want to outsource SRC transaction security to the SRC System; (b) the consumer consents to having the SRC System provide his or her Consumer Identity (CI) to the Issuer FI; and (c) the Issuer FI wants to offer its' consumers or users an intuitive user experience. It should be noted that both of the above scenarios are GDPR compliant. In addition, in some embodiments increasing or upgrading the trust of the consumer channel from "untrusted" to "trusted" can be realized in real time when the consumer selects an "SRC button," for example, during a "card add" process or during an SRC payment transaction. Such processing is advantageous because it does not require a separate "out-of-band" user experience which would force a consumer to provide additional information via one or more interfaces in preparation for the SRC transaction, which extra steps are somewhat inconvenient and may cause the consumer to abandon the transaction.

Figure 1:
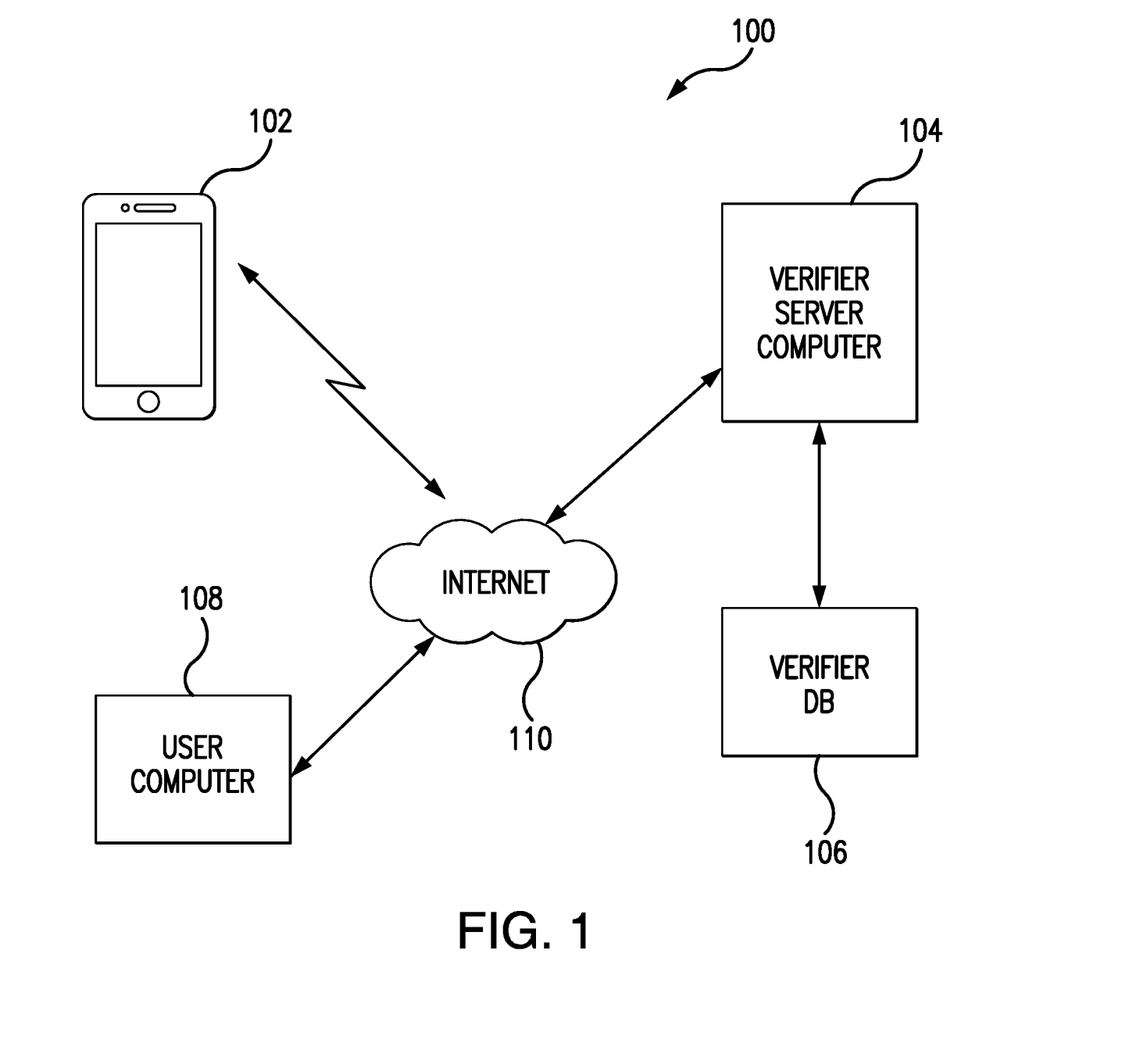
FIG. 1 is a block diagram of a user authentication system to illustrate a One-Time-Password (OTP) authentication process in accordance with embodiments of the disclosure.

FIG. 1 is a block diagram of a user authentication system 100 for illustrating how a One-Time-Password (OTP) authentication mechanism operates in accordance with the disclosure. In some embodiments, the user authentication system 100 includes a user mobile device 102 (for example, an iPhone™ or an Android™ smartphone, a tablet computer such as an iPad™, a laptop computer, a digital music player, a personal digital assistant (PDA) and the like), a verifier computer 104, a verifier database 106, and user computer 108. In implementations, the user mobile device 102 may run browser software, for example, and communicate via the Internet with the verifier computer 104. The verifier computer 104 may also be configured for communicating via the Internet 110 with the user computer 108. It should be understood that some of the various components shown in FIG. 1 may be a subset of a larger system, and therefore that more or less components and/or devices may be utilized. For example, although only one user mobile device 102 and one verifier computer 104 are shown, in some practical embodiments a plurality of such devices or components may be utilized. In addition, although specific embodiments are described herein, it should be understood that this is for illustrative purposes only and that different components and/or configurations and/or computer systems and/or computer networks could be used without departing from the spirit and scope of this disclosure.

The OTP authentication protocol is one of the most used two-factor authentication mechanisms for Internet security and/or e-commerce security and/or digital security in use today. One reason for its popularity is that no requirement exists for using complicated cryptographic mechanisms and/or programs which include complex key management requirements and/or require difficult user setup routines. Instead, an OTP authentication protocol can be initialized and deployed during real-time operation by the user and is rather easy for that consumer to utilize.

In order to utilize an OTP mechanism, the consumer must first enroll or register offline and create a trusted channel (or tenured channel) with a Verifier. For example, in one method the consumer may register an e-mail address of "email_addr1" during a face-to-face interaction with a representative of the Verifier institution (for example, a bank representative when opening a bank checking account or applying for a bank credit card account), which knows the consumer because the verifier identified the consumer previously. In some implementations, the consumer may have registered a set of security questions with the Verifier's representative, which may have been selected by the consumer from a list of pre-established questions provided by the Verifier. In some embodiments the answers to the security questions are communicated in a face-to-face meeting with the Verifier's representative. The security questions and consumer answers are then stored in connection with a consumer identifier for use in the future. Thus when the consumer enrolls remotely with a Verifier's service, he or she provides e-mail address information and or mobile telephone number information on the Verifier's website. The consumer may be required to provide, using his or her email address or mobile telephone number, answers to one or more security questions which were chosen by the him or her and wherein the answers are known to the Verifier (which were already pre-established and which may be presented in a menu format to the consumer). If the consumer provides the correct answers, the Verifier has confirmation that the new e-mail and/or mobile phone number represents a trusted channel associated with the consumer.

Due to the enrollment process, the Verifier recognizes that future e-mail and/or mobile communications will occur via a trusted channel with the consumer. Thus, after completing the enrollment process, in the future the consumer can use the OTP authentication service (as a two-factor authentication mechanism). The Verifier (such as a bank or Issuer FI) searches for the consumer's e-mail address (email_addr1 in this example), based on his or her identifier (Consumer_ID), finds the e-mail address which represents a first factor (something the consumer has), and then sends an e-mail message (to email_addr1) that includes a one-time password for the consumer, which represents the second factor (something the consumer knows). The consumer receives the e-mail message, opens it, and utilizes the OTP to prove his or her identity by transmitting back this OTP to the verifier service.

The OTP consists of a randomly generated special code which the consumer must transmit back to the Verifier's service before it expires (which expiration time, such as 30 seconds or 5 minutes, for example, may be specified by the Verifier and may depend on details or criteria of the transaction).

Referring again to FIG. 1, the OTP mechanism functions in the following manner. A consumer utilizes his or her mobile device 102 (or user computer 108) to enroll or register via the Internet 110 with the verifier computer 104 of the verifying party, as explained above. Thus, the Verifier computer 104 recognizes that a communication channel (for example, the consumer's e-mail address or mobile telephone number) is associated with the consumer and is labeled as a trusted channel because the Verifier computer knows it to be associated with the consumer. Next, when the consumer's mobile device 102 wants to demonstrate its identity to get access to a service run by the Verifier computer 104, the consumer mobile device 102 transmits its identity to the Verifier computer 104 on the service interface. The Verifier computer 104 retrieves from its Verifier service database 106 the trusted channel associated with the consumer's identity and then generates, for the current authentication session, a message such as "OTP_witness" at random. The Verifier computer 104 then transmits the "OTP_witness" message to the consumer (for example, via the Internet to the consumer's mobile device) using the trusted channel. The consumer retrieves the OTP_witness message from the trusted channel and replies to the OTP_witness message by transmitting the value or code in that message back to the Verifier computer 104 as an OTP_value on the service interface. The Verifier computer 104 then determines whether or not the OTP_value it received from the consumer mobile device 102 matches the value contained in the OTP_witness message. If it does match, then the Verifier computer 104 is persuaded that the consumer "owns" the communication channel and designates it as "something you have" (which is the first factor of a two-factor authentication process) since the consumer would not otherwise be able to access the OTP_witness message. In addition, since the consumer knows the value of the OTP_witness message, the Verifier computer 104 is persuaded that the consumer has "something you know" (which is the second factor), meaning that the consumer is indeed at the other end of the communication during this process. Such operation can be considered a two-factor authentication method that is "payment services directive two" (PSD2) compatible, for example, if the following security assumptions are true: (1) The telecom operator (who provides telecommunications services to the consumer's device), which really owns the e-mail channel and/or mobile telephone channel, does not interfere by eavesdropping as long as the consumer respects his contractual obligations; and (2) a hacker cannot control the consumer's device by taking advantage of hardware or software weaknesses of that device.

With regard to the OTP process described above, the decision to utilize an e-mail address (or a mobile phone number) as the Consumer Identity (CI) of a user in the SRC system may create confusing and/or conflicting consequences.

If the Issuer FI needs assurance from the consumer concerning the addition of another digital card to her Consumer Profile (i.e., the consumer wishes to add a new leaf to the Consumer Profile data structure), then the SRC System's channel associated with the CI cannot be utilized in an OTP authentication mechanism, for the following two reasons. First, the consumer provided this e-mail address (or alternatively, mobile phone number) to the SRC System, and did not provide it to the Issuer FI; thus, in order to stay GDPR compliant the SRC System cannot make the CI known to the Issuer FI without the explicit consent of the consumer. Second, the SRC System e-mail address of the Consumer is untrusted for both the SRC System and the Issuer FI because the SRC System does not know whether or not that e-mail address actually belongs to that consumer (since the SRC System has no way to know how the Consumer may be associated with that e-mail address from any other out-of-band experience, digital activity, or the like). However, the consumer's expectation is that, after enrolling with SRC System under her chosen CI, any subsequent operations (and especially any user assurance-related operations for Cardholder Authentication to securely add new card accounts or for using the SRC payment method) would utilize that CI email address without needing any further input from the consumer. Consequently, the consumer would be surprised and possibly confused when approached for SRC related operations on a different e-mail address and/or mobile telephone number than the CI provided to the SRC System at enrollment. The different e-mail and/or mobile channels may be known to Issuer FIs and to other Wallet Providers and/or Token Requestors from previous interactions concerning digital payment activities with the consumer (i.e., through the use of services such as Apple Pay™, Android Pay™, and the like), but not known to the SRC System. Accordingly, the disclosed methods and systems enables use of the CI provided to the SRC System during enrollment for subsequent operations and therefore avoids the above described confusing situation, resulting in providing good usability for consumers.

As mentioned earlier, in order to allow mass deployment of secure remote commerce transactions, in embodiments disclosed herein the operator of an SRC System provides services to Issuer financial institutions (FIs) to ease their participation in SRC transactions. Specifically, the operator of the SRC System offers tokenization by default, provides payment assurance data (cryptograms) by running platform-based 3DS2 processes, and handles security issues regarding adding consumer digital payment cards to his Consumer Profile via Cardholder Authentication services. All of the above rely on the use of One-Time-Password (OTP) security-based mechanisms based on trusted channels, for example, e-mail and/or mobile telephone numbers known to be associated with the consumer. This is true both for the case wherein the OTP mechanism is handled directly by a platform (such as the Mastercard Digital Enablement Services (MDES) platform operated by Mastercard International Incorporated for tokenization) or by an access control server (ACS) of the 3DS2 system operated by the SRC System (for proof of payment). However, as mentioned above, since the SRC System does not own the consumer (who belongs to the Issuer FI, or to the bank that issued the consumer's payment account) then a trust or confidence process must be used to transfer trust from the Issuer FI to the SRC System (via upgrading an untrusted channel to a trusted channel) to allow the SRC System to handle secure OTP processing on behalf of the Issuer FI or bank.

As explained above with regard to FIG. 1, an initial "moment zero" trusted channel must be established offline, only by the consumer interacting with a human operator of a service provider in an enrolment process. From the perspective of usability, this requirement of the enrollment process is acceptable when a consumer visits the bank for the first time when opening his or her account. However, subsequent human interaction is unacceptable for further services, for example, issuing a plastic card, issuing a token corresponding to the plastic card, and/or enrolling that token for other payment services, such as e-commerce services offered by various payment schemes. As recognized by those of skill in the art, there is always the risk that the consumer will abandon enrollment altogether in an initial service (like when tokenizing her card) if she needs to complete a multi-step enrollment process in order to obtain the service.

That reluctance to enroll may increase when the same Verifier (i.e., the bank) offers a "subsequent service" (different from the "initial service," for example, use of the SRC system as an e-commerce platform), where the consumer refuses to accept going through the same or similar complex enrollment procedure—like creating a token—a second time. Methods described herein solve this issue by upgrading the consumer's untrusted channel (untenured) into a trusted channel (tenured).

For example, when the consumer subscribes to a Subsequent Service, for example, the SRC system, after having already digitized his card with the MasterCard Digital Enablement Service (MDES) System via a wallet provider or token requester (as an initial service), she may enroll with a different e-mail address such as "email_addrNew" (which is different than email_addr1, with which she has enrolled with the wallet provider when tokenizing her card). The Subsequent Service records this new email address temporarily in its' consumer database in association with a "Consumer_ID" and marks it as "untrusted" since the Subsequent Service has no information to link "email_addrNew" as a trusted channel with the Consumer_ID. In such a case, in accordance with the GDPR, the consumer has "not consented" to share consumer data because the Subsequent Service did not request and obtain explicit consent from the consumer to share information between the Subsequent Service and the Verifier (which may be different jurisdictional entities). Thus, except for recording the new email address (email_addrNew) on the Subsequent Service's site, the Consumer is not compelled or asked for any other information and/or interaction requirements to prove that she is the legitimate entity, which gives her the impression that enrolling or signing up for the subsequent service was easy. However, the Verifier cannot use this untrusted channel (email_addrNew) to send OTP values to the Consumer for OTP authentication because such operation would not represent a two-factor authentication mechanism. Therefore, the Subsequent Service must drive a process for new e-mail address verification and communicate the new e-mail to the Verifier if and when all checks are correct.

Figure 2:
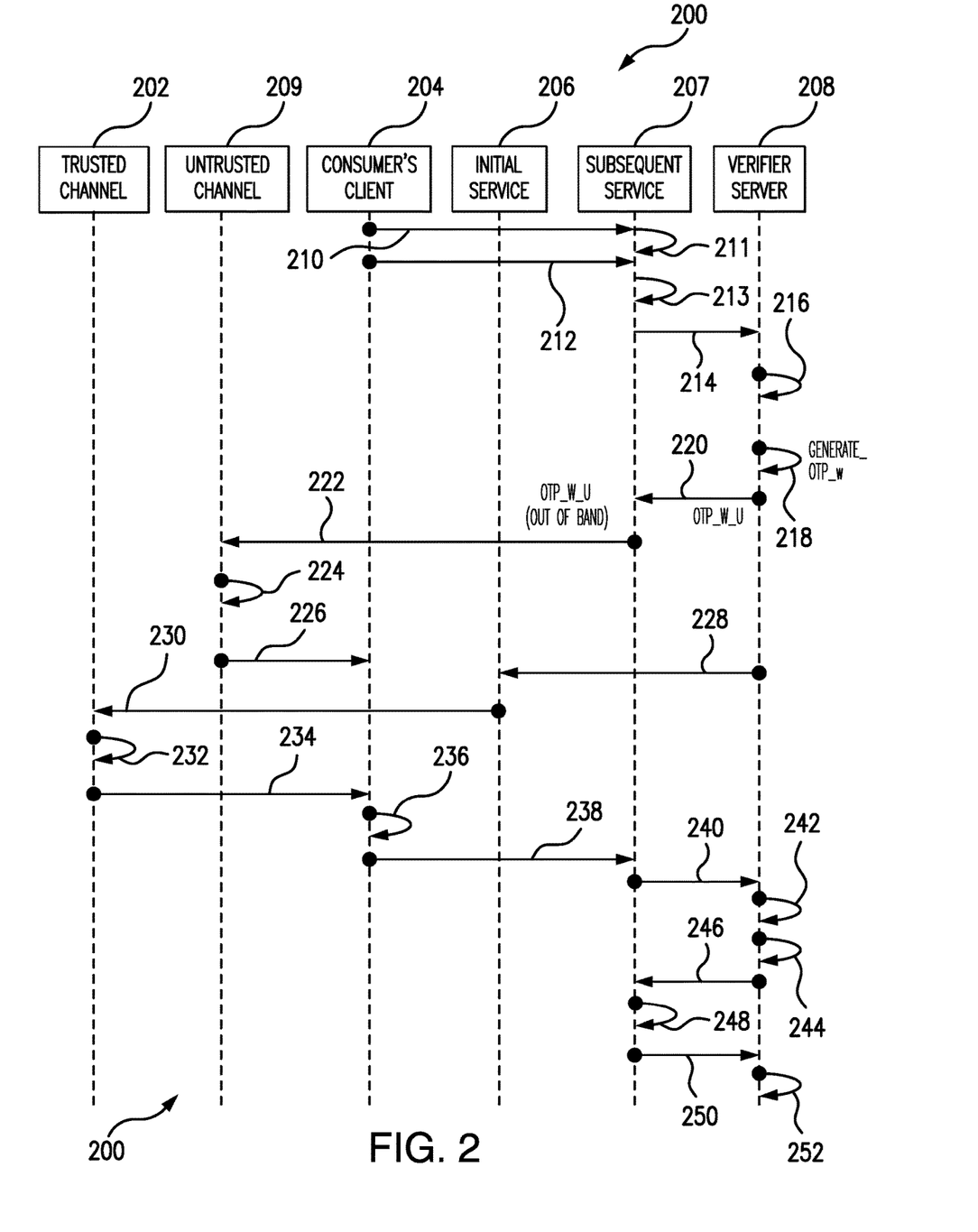
FIG. 2 is a flow diagram illustrating a process for upgrading an untrusted channel to a trusted channel in accordance with the disclosure.

FIG. 2 is a flow diagram 200 illustrating a protocol for transforming an untrusted channel (e.g., email_addrNew) into a trusted channel in a manner that is GDPR compliant for use in an OTP mechanism in accordance with some embodiments. A necessary initial condition (but not one that is sufficient alone) is that a trusted channel 202 (email_addr1) is known to the Verifier as a result of the consumer enrolling for an initial service 206. For example, the consumer may enroll with her Consumer_ID, for example, by using her consumer's client 204 (which may be installed, for example, on a consumer mobile device, or on a personal computer, or on any other form factor) to communicate with the Verifier server 208. Thus, when the consumer requests a subsequent service 207, the consumer registers 210 "email_addrNew" with the subsequent service 207. The subsequent service 207 then stores 211 that email address "email_addrNew" in an address list along with the Consumer_ID and with an "untrusted" channel designation.

Referring again to FIG. 2, when the consumer next utilizes her consumer's client 204 to invoke, under her Consumer_ID, a service request 212 for the subsequent service 207 (for example, the subsequent service may be a request to add a payment card account or token to the SRC system), the subsequent service 207 retrieves 213 from a verifier database based on the Consumer_ID, the untrusted channel "email_addrNew" it has initialized for the consumer. Next, the subsequent service 207 transmits 214 a request to verify an untrusted channel address to the Verifier server 208. The Verifier server 208 then retrieves 216 the trusted channel address (e.g., "email_addr1") that is associated with the Consumer_ID (which trusted channel was designated during the previous enrollment process of the consumer's subscription to the Initial Service 206, for example, when the consumer tokenized his card with a token requestor through the MDES system). The Verifier also generates 218 a one-time password witness value "OTP_w" which contains "n" alphanumeric characters (wherein "n" is at least six but preferably eight characters long, so that the one-time password witness address is 6 to 8 alphanumeric characters long). Next, the verifier server 208 splits the "OTP_w" value into two separate parts. For example, it may be split into a first part or first portion "OTP_w_U" consisting of the leftmost two characters of OTP_w, and a second portion "OTP_w_T" consisting of the rightmost n−2 characters of "OTP_w." Of course, the first and second portions may include or contain more characters, depending on whether usability is still considered to be consumer-friendly.

Continuing with the process, the Verifier transmits 220 the "OTP_w_U" value to the Subsequent Service 207, and the Subsequent Service then transmits 222 the "OTP_w_U" value in an out of band email (an independent channel of communication) addressed to the Untrusted Channel 209, identified by "email_addrNew" of the consumer. When the Untrusted Channel 209 receives the "OTP_w_U" value, it is displayed to the consumer with a question that asks the consumer if she consents to share the email address "email_addrNew" with the Verifier. If the consumer gives consent, then the 2 digits of the "OTP_w_U" value are transposed 224 and set equal to the value "rOTP_w_U" (i.e., if the initial value was "21" then the transposed value is "12"), which is then retrofit (fed back on a different channel) and transmitted 226 to the Consumer's client 204.

Referring again to FIG. 2, the Verifier also transmits 228 the "OTP_w_T" value and the trusted channel address "email_addr1" to the Initial Service 206. The Initial Service 206 then transmits 230 the "OTP_w_T" value in an out of band email (an independent channel of communication) addressed to the Trusted Channel 202 identified by "email_addr1" of the consumer. The Trusted Channel then retrieves 232 the "OTP_w_T" value and transmits 234 the "OTP_w_T" value to the Consumer's client 204 (for example, the consumer's mobile device). The Consumer's client 204 then recomposes 236 an "OTP_v_Y" value (corresponding to the "Yes" for the consumer's consent) as "rOTP_w_U" concatenated with "OTP_w_T" (i.e., OTP_v_Y=rOTP_w_U∥OTP_w_T).

As also shown in FIG. 2, the Consumer's client 204 then transmits 238 the "OTP_v_Y" value to the Subsequent Service 207. The Subsequent Service 207 then transmits 240 the "OTP_v_Y" value (which indicates the consumer's consent) to the Verifier's Server 208. The Verifier sever 208 then splits 242 the "OTP_v_Y" value into rOTP_w_U∥OTP_w_T and computes or generates "OTP_v" as a reverted value of rOTP_w_U (which leads back to the initial OTP_w_U) concatenated with OTP_w_T. Next, if the Verifier determines 244 that OTP_v value equals the OTP_w value (which was initially generated by the Verifier's Server 208), then the Verifier server informs 246 the Subsequent Service 207 that consumer's authentication was established. However, if the Verifier determines 244 that the OTP_v value does not equal the OTP_w value (which was initially generated by the Verifier's Server 208), then the Verifier server may transmit a message to the Subsequent Service 207 that the consumer has not been authenticated and the process ends.

Referring again to FIG. 2, after the Verifier determines 244 that the OTP_v value equals the OTP_w value and the Verifier server transmits 246 a message to the Subsequent Service 207 that the consumer's authentication has been established, then the Subsequent Service 207 grants 248 a service authorization to the consumer. The Subsequent Service 207 also changes the qualification of the channel from "untrusted" to "trusted", and stores the information (Consumer_ID, email_addrNew, a "trusted" designation). Next, the subsequent service 207 transmits 250 a registration request for email_addrNew as a trusted channel, for use if the Verifier server is granted on-behalf-of processing of OTP authentication for the subsequent service 207. The Verifier server 208 also receives 250 the information (Consumer_ID, email_addrNew, "Trusted") and stores 252 the same information (Consumer_ID, email_addrNew, "Trusted"), for subsequent verifier server processing of the consumer's authentications using this channel.

Figure 3:
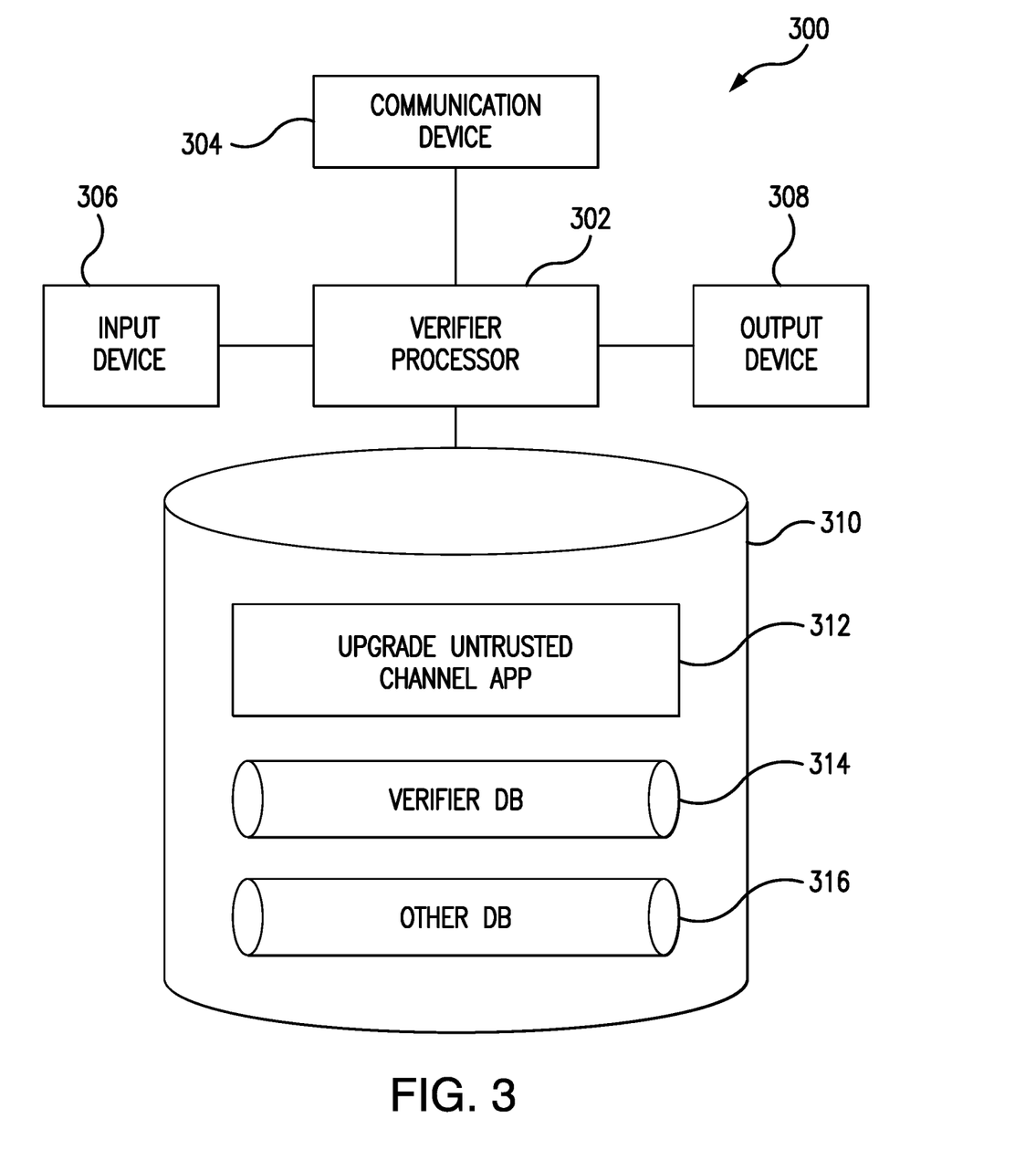
FIG. 3 is a block diagram of a verifier server computer to illustrate aspects according to embodiments of the disclosure.

FIG. 3 is a block diagram that illustrates an example embodiment of a verifier computer system 300 which may be utilized in accordance with aspects of the present disclosure. The verifier computer system 300 may include standard components and/or custom-designed and/or proprietary components in terms of its hardware and/or architecture, and may be controlled by software to cause it to function as described herein. For example, the verifier computer system 300 may include server computer hardware components.

The verifier computer system 300 may include a verifier processor 302 operatively coupled to a communication device 304, an input device 306, an output device 308, and a storage device 310. The verifier processor 302 may be constituted by one or more processors, and operates to execute processor-executable steps, contained in program instructions described below, so as to control the verifier computer system 300 to provide the desired functionality as described herein.

Communication device 304 may be used to facilitate communication with, for example, other devices (such as consumer mobile devices, user computers, one or more wallet provider computers, and one or more computers operated by a payment processing network, and the like). For example, communication device 304 may comprise numerous communication ports (not separately shown), to allow the verifier computer system 300 to communicate simultaneously with a number of other computers and other devices, including communications as required to simultaneously process numerous one-time password requests and/or consumer authentication processes. Thus, the communication device 304 may be configured for wireless communications and/or wired communications via various different types of networks, such as the Internet.

Input device 306 may comprise one or more of any type of peripheral devices typically used to input data into a computer. For example, the input device 306 may include a keyboard and a mouse. Output device 308 may comprise, for example, a display and/or a printer. In some embodiments, the input device 306 and the output device 308 comprise a touch screen.

Storage device 310 may comprise any appropriate information storage device, including combinations of magnetic storage devices (e.g., hard disk drives), optical storage devices such as CDs and/or DVDs, and/or semiconductor memory devices such as Random Access Memory (RAM) devices and Read Only Memory (ROM) devices, as well as flash memory and the like. Any one or more of such information storage devices may be considered to be a non-transitory computer-readable storage medium or computer usable medium or memory.

Storage device 310 stores one or more computer programs for controlling verifier processor 302. The programs comprise program instructions (which may be referred to as computer readable program code means) that contain processor-executable process steps of the verifier computer system 300, executed by the verifier processor 302 to cause the verifier computer system 300 to function as described herein.

The programs may include one or more conventional operating systems (not shown) that control the verifier processor 302 to manage and coordinate activities and sharing of resources in the verifier computer system 300, and to serve as a host for application programs that run on the verifier computer system 300.

The storage device 310 may store an upgrade untrusted channel application 312 that controls the verifier processor 302 to enable the verifier computer system 300 to provide untrusted channel upgrade services that are GDPR compliant, and which enable, for example, an SRC system to provide on-behalf-of consumer authentication services for an issuer FI. The storage device 310 may also store, and the verifier computer system 300 may also execute, other programs, which are not shown. For example, such programs may include a user enrollment application, which enrolls users or consumers in one or more services. Other programs can also include, e.g., one or more data communication programs, database management programs, device drivers, etc.

The storage device 310 may also store a verifier database 314, which may be used to store newly registered trusted consumer channels and associated consumer data. In addition, storage device 310 may also include one or more other databases 316 which may include data required for operation of the verifier computer system 300. Such databases may include, for example, a database of issuer financial institution identification numbers, and/or other data needed for the verifier computer system 300 to properly process channel upgrade requests.

Figure 4:
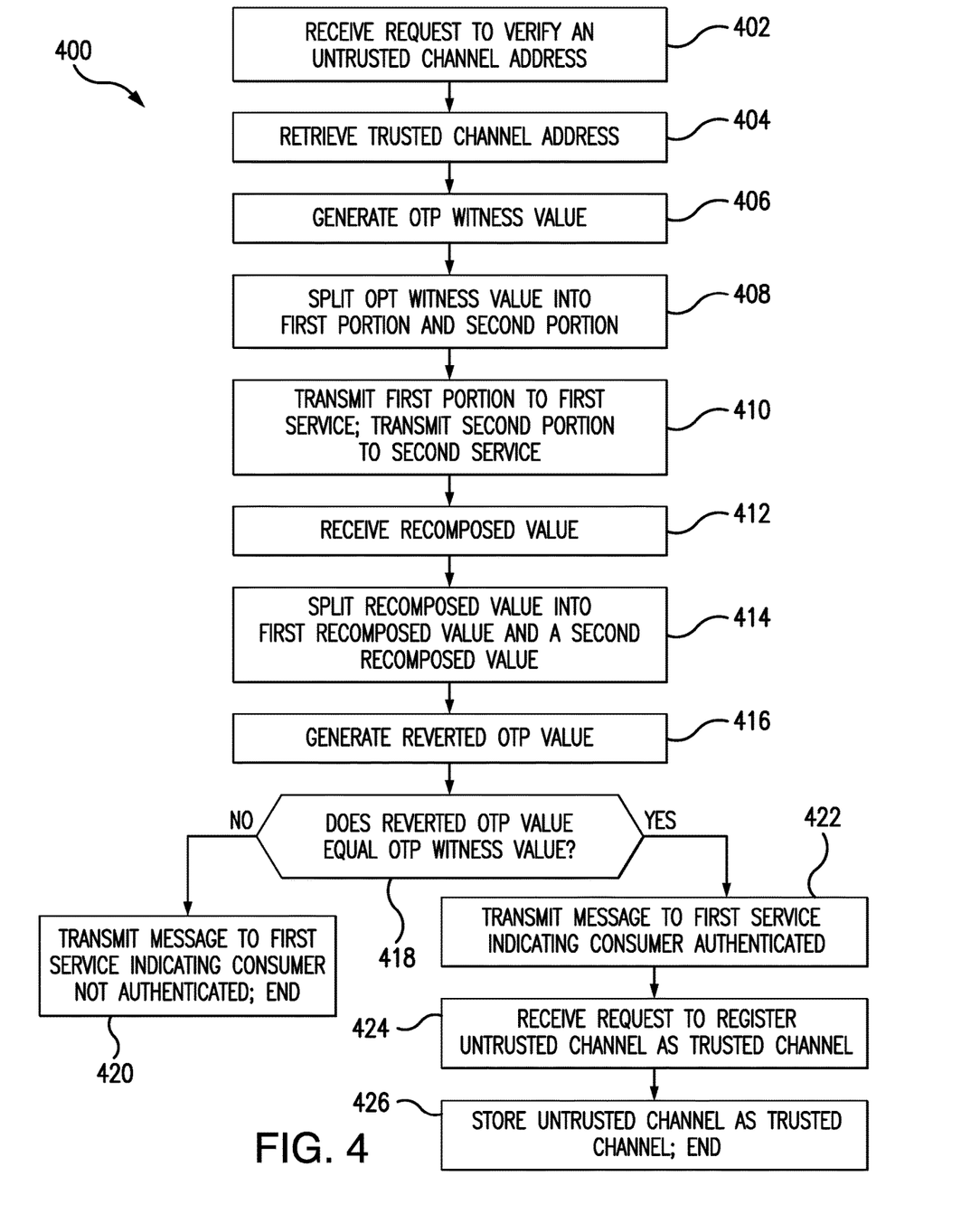
FIG. 4 is a flowchart of a verifier service process for upgrading according to aspects described herein.

FIG. 4 is a flowchart illustrating a Verifier service process 400 for upgrading an untrusted channel to a trusted channel in accordance with the processes described herein. The process begins when a verifier server computer receives 402 a request to verify an untrusted channel address associated with a Consumer identifier ("Consumer_ID"). The verifier server computer then retrieves 404 the trusted channel address of the consumer associated with the consumer identifier (Consumer_ID) from a verifier database, and generates 406 a one-time password witness ("OTP-w") value containing "n" characters. The verifier server computer then splits 408 the one-time password witness value ("OTP-w") into a first portion ("OTP_w_U"), which may consist of the leftmost two characters of OTP_w, and into a second portion ("OTP_w_T") which then would consist of the rightmost n−2 characters of OTP_w. Next, the verifier server transmits 410 the first portion ("OTP_w_U") to the first service component, and transmits the second portion of the one-time password witness value ("OTP_w_T") and the trusted channel address to a second service component, The verifier server computer then receives 412 from the first service component, a recomposed value generated by a consumer's client, splits 414 the recomposed value into a first recomposed value and a second recomposed value, and generates 416 a reverted one-time password value based on the first and second recomposed values. Next, the verifier server determines 418 if the reverted one-time password value equals the one-time password witness value. If the verifier server determines 418 that the one-time password value does not equal the one-time password witness value, then the verifier server transmits 420 a message to the first service component indicating that the consumer has not been authenticated, and the process ends.

Referring again to FIG. 4, If the verifier server determines 418 that the one-time password value equals the one-time password witness value, then the verifier server computer transmits 422 an authentication message to the first service component confirming authentication of the consumer, thus enabling upgrading of the untrusted channel to a trusted channel. In some embodiments, at this point the verifier server computer determines or recognizes that on behalf of processing of OTP authentication has been granted by the first service component to the verifier service computer. In an implementation, the verifier server computer may also receive 424 a registration request from the first service component that may include a request to store the untrusted channel address as a trusted channel address. In this case, the verifier server computer next stores 426 the untrusted channel address with a trusted channel designation in a verifier database for subsequent verifier server processing of the consumer's authentications when he or she uses this channel.

The processes and systems described herein thus beneficially permits the secure upgrade of an untrusted channel into a trusted channel on a digital platform in a manner that is GDPR compliant. As a result, a secure remote commerce (SRC) platform can advantageously upgrade an untrusted channel to a trusted channel in order to perform secure one-time password (OTP) processing on behalf of issuer financial institutions (FI's), which advantageously allows for secure and fast mass deployment of SRC transactions by removing the necessity for each issuer FI to handle costly and complex security operations. In addition, financial institutions can gain access to new trusted channels for their consumers, with consumer consent.

As used herein and in the appended claims, the term "computer" should be understood to encompass a single computer or two or more computers in communication with each other or a computer network or computer system. In addition, as used herein and in the appended claims, the term "processor" should be understood to encompass a single processor or two or more processors in communication with each other. Moreover, as used herein and in the appended claims, the term "memory" should be understood to encompass a single memory or storage device or two or more memories or storage devices. Such a memory and/or storage device may include any and all types of non-transitory computer-readable media, with the sole exception being a transitory, propagating signal.

The flow charts and descriptions thereof herein should not be understood to prescribe a fixed order of performing the method steps described therein. Rather, the method steps may be performed in any order that is practicable. In addition, the flow charts described herein should not be understood to require that all steps or elements be practiced in every embodiment. For example, one or more elements or steps may be omitted in some embodiments.

Although the present disclosure describes specific exemplary embodiments, it should be understood that various changes, substitutions, and alterations apparent to those skilled in the art can be made to the disclosed embodiments without departing from the spirit and scope of the disclosure as set forth in the appended claims.

What is claimed is:

1. A method for upgrading an untrusted channel to a trusted channel that complies with the General Data Protection Regulation (GDPR), comprising:
   receiving, by a verifier server from a first service component, a request to verify an untrusted channel address comprising a consumer identifier;
   retrieving, by the verifier server from a verifier database, the trusted channel address of the consumer associated with the consumer identifier;
   generating, by the verifier server, a one-time password witness value containing at least six and a maximum of eight alphanumeric characters;
   splitting, by the verifier server, the one-time password witness value into a first portion comprising at least the two leftmost alphanumeric characters and a second portion comprising at least the two rightmost alphanumeric characters;
   transmitting, by the verifier server to the first service component, the first portion of the one-time password witness value;
   transmitting, by the verifier server to a second service component, the second portion of the one-time password witness value and the trusted channel address;
   receiving, by the verifier server from the first service component, a recomposed value generated by a consumer's client, the recomposed value including the two leftmost alphanumeric characters;
   splitting, by the verifier server, the recomposed value into a first recomposed value and a second recomposed value;
   generating, by the verifier server, a reverted one-time password value based on the first and second recomposed values;
   determining, by the verifier server, that the reverted one-time password value equals the one-time password witness value;
   transmitting, by the verifier server to the first service component, an authentication message confirming authentication of the consumer and enabling upgrading of the untrusted channel to a trusted channel;
   receiving, by the verifier server from the first service component, a registration request comprising a request to store the untrusted channel address as a trusted channel address;
   determining, by the verifier server, that on behalf of processing of one-time password authentication has been granted by the first service component; and
   storing, by the verifier server in the verifier database, the untrusted channel address with a trusted channel designation.

2. The method of claim 1, wherein the registration request further comprises a consumer identifier, and further comprising storing, by the verifier server in a verifier database, the consumer identifier with the untrusted channel address with a trusted channel designation.

3. A verifier computer apparatus for upgrading an untrusted channel to a trusted channel in a manner compliant with the General Data Protection Regulation (GDPR), comprising:
   a verifier processor;
   a communication device operably connected to the verifier processor; and a storage device operably connected to the verifier processor and storing instructions causing the verifier processor to:
receive a request from a first service component to verify an untrusted channel address associated with a consumer identifier;
retrieve the trusted channel address of the consumer associated with the consumer identifier from a verifier database;
generate a one-time password witness value containing at least six and a maximum of eight alphanumeric characters;
split the one-time password witness value into a first portion comprising at least the two leftmost alphanumeric characters and a second portion comprising at least the two rightmost alphanumeric characters;
transmit the first portion of the one-time password witness value to the first service component;
transmit the second portion of the one-time password witness value and the trusted channel address to a second service component;
receive a recomposed value generated by a consumer's client from the first service component, the recomposed value including the two leftmost alphanumeric characters;
split the recomposed value into a first recomposed value and a second recomposed value;
generate a reverted one-time password value based on the first and second recomposed values;
determine that the reverted one-time password value equals the one-time password witness value;
transmit an authentication message to the first service component confirming authentication of the consumer and enabling upgrading of the untrusted channel to a trusted channel;
receive a registration request from the first service component comprising a request to store the untrusted channel address as a trusted channel address;
determine that on behalf of processing of one-time password authentication has been granted by the first service component; and
store the untrusted channel address with a trusted channel designation in the verifier database.

4. The apparatus of claim 3, wherein the instructions for receiving a registration request further comprises instructions causing the verifier processor to receive a consumer identifier, and wherein the storage device stores further instructions causing the verifier processor to:
store the consumer identifier with the untrusted channel address in the verifier database with a trusted channel designation.

5. A system for upgrading an untrusted channel to a trusted channel in a manner compliant with the General Data Protection Regulation (GDPR), comprising:
a verifier server computer comprising a verifier processor, a communication device operably connected to the verifier processor, a first service component and a second service component, and a storage device operably connected to the verifier processor;
a verifier database operably connected to the verifier server computer; and
a user device operably connected to the verifier server computer;
wherein the storage device of the verifier server computer stores instructions causing the verifier processor to:
receive a request from the first service component to verify an untrusted channel address associated with a consumer identifier;
retrieve the trusted channel address of the consumer associated with the consumer identifier from the verifier database;
generate a one-time password witness value containing at least six and a maximum of eight alphanumeric characters;
split the one-time password witness value into a first portion comprising at least the two leftmost alphanumeric characters and a second portion comprising at least the two rightmost alphanumeric characters;
transmit the first portion of the one-time password witness value to the first service component;
transmit the second portion of the one-time password witness value and the trusted channel address to the second service component;
receive a recomposed value from the first service component, the recomposed value generated by a consumer's client running on the user device and including the two leftmost alphanumeric characters;
split the recomposed value into a first recomposed value and a second recomposed value;
generate a reverted one-time password value based on the first and second recomposed values;
determine that the reverted one-time password value equals the one-time password witness value;
transmit an authentication message to the first service component confirming authentication of the consumer and enabling upgrading of the untrusted channel to a trusted channel;
receive a registration request from the first service component comprising a request to store the untrusted channel address as a trusted channel address;
determine that on behalf of processing of one-time password authentication has been granted by the first service component; and
store the untrusted channel address with a trusted channel designation in the verifier database.

6. The system of claim 5, wherein the instructions for receiving a registration request stored in the storage device of the verifier server computer further comprises instructions causing the verifier processor to receive a consumer identifier, and wherein the storage device of the verifier server computer stores further instructions causing the verifier processor to:
store the consumer identifier with the untrusted channel address in the verifier database with a trusted channel designation.

7. The system of claim 5, wherein the user device comprises a consumer mobile device.

* * * * *